United States Patent [19]
Bechtel et al.

[11] 3,755,812
[45] Aug. 28, 1973

[54] MOVING AND HARD TARGET INDICATOR

[75] Inventors: Bartow Bechtel, Richardson; John L. Snyder, Garland, both of Tex.

[73] Assignee: Texas Intruments Incorporated, Dallas, Tex.

[22] Filed: Dec. 29, 1967

[21] Appl. No.: 694,748

[52] U.S. Cl............ 343/7.7, 343/5 CD, 343/5 MM, 343/5 ST, 343/17
[51] Int. Cl............................................... G01s 9/42
[58] Field of Search............... 343/5 MM, 5 ST, 7.7, 343/7.9, 17, 5 CD

[56] References Cited
UNITED STATES PATENTS

| | | | |
|---|---|---|---|
| 2,705,758 | 4/1955 | Kaprelian | 343/7.7 UX |
| 2,814,199 | 11/1957 | Waldorf et al. | 343/5 MM |
| 2,901,747 | 8/1959 | Sunstein | 343/7.9 X |
| 2,975,415 | 3/1961 | Klasens | 343/7.7 X |
| 3,048,837 | 8/1962 | Hart | 343/17 X |
| 2,597,636 | 5/1952 | Hall et al. | 343/7.7 |

*Primary Examiner*—T. H. Tubbesing
*Attorney*—Samuel M. Mims, Jr., James O. Dixon, Andrew M. Hassell, Harold Levine, John E. Vandigriff and Rene E. Grossman

[57] ABSTRACT

Apparatus for displaying video radar signals of moving and hard targets including a direct view storage tube displaying the area under surveillance on one 180° sector and the mirror image of the scanned area on the opposite 180° sector. A dichroic beam splitter mirror is positioned orthogonal to the surface of the storage tube along a diameter between the two 180° display sectors to color code the differences between the two displays. For airborne operations, the composite display is ground stabilized by an operator observing the ground track velocity and cross-track errors, and readjusting the display stabilization to null the observed error.

34 Claims, 25 Drawing Figures

INVENTORS
Bartow Bechtel
John L. Snyder
BY René E. Grossman
ATTORNEY

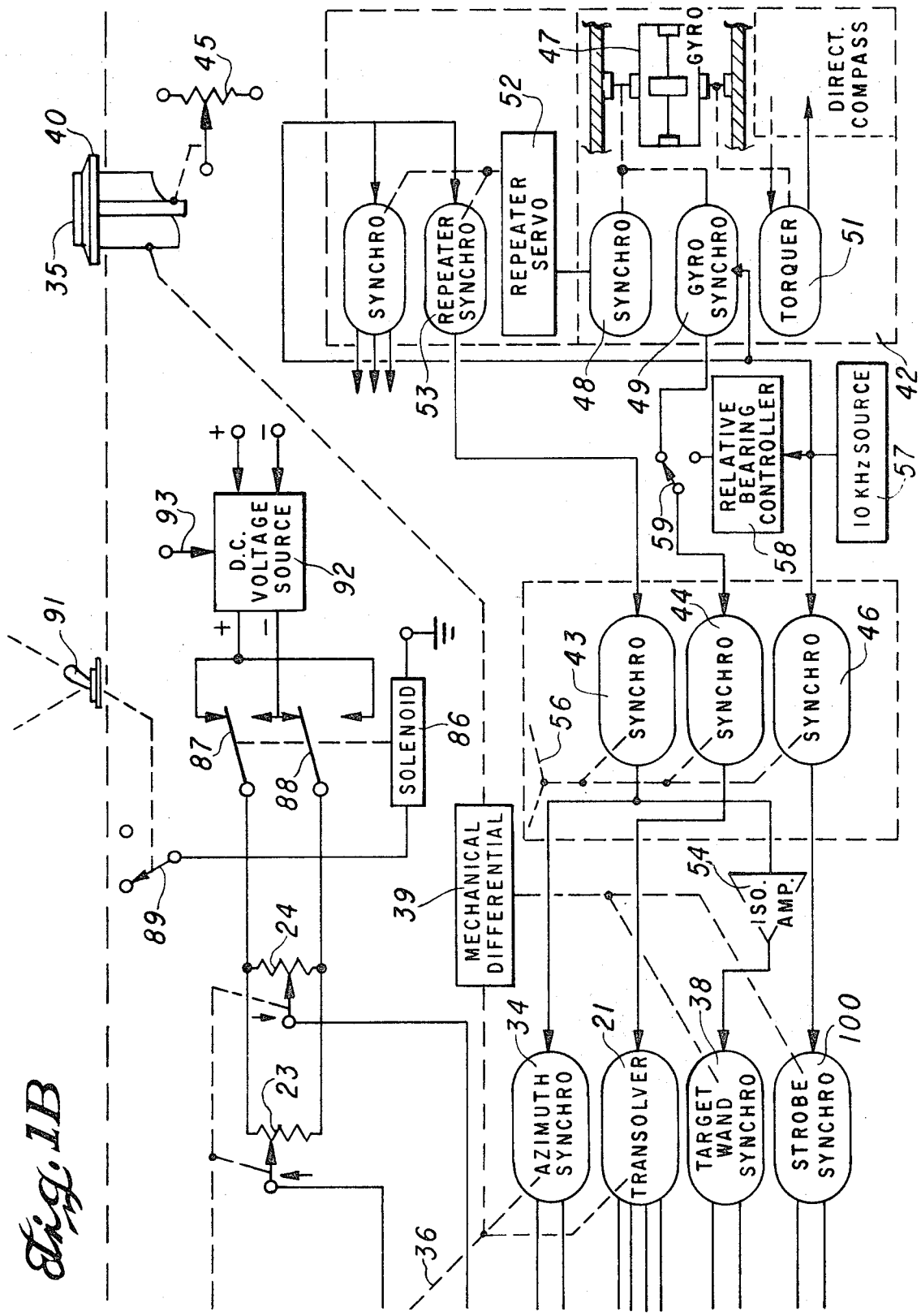

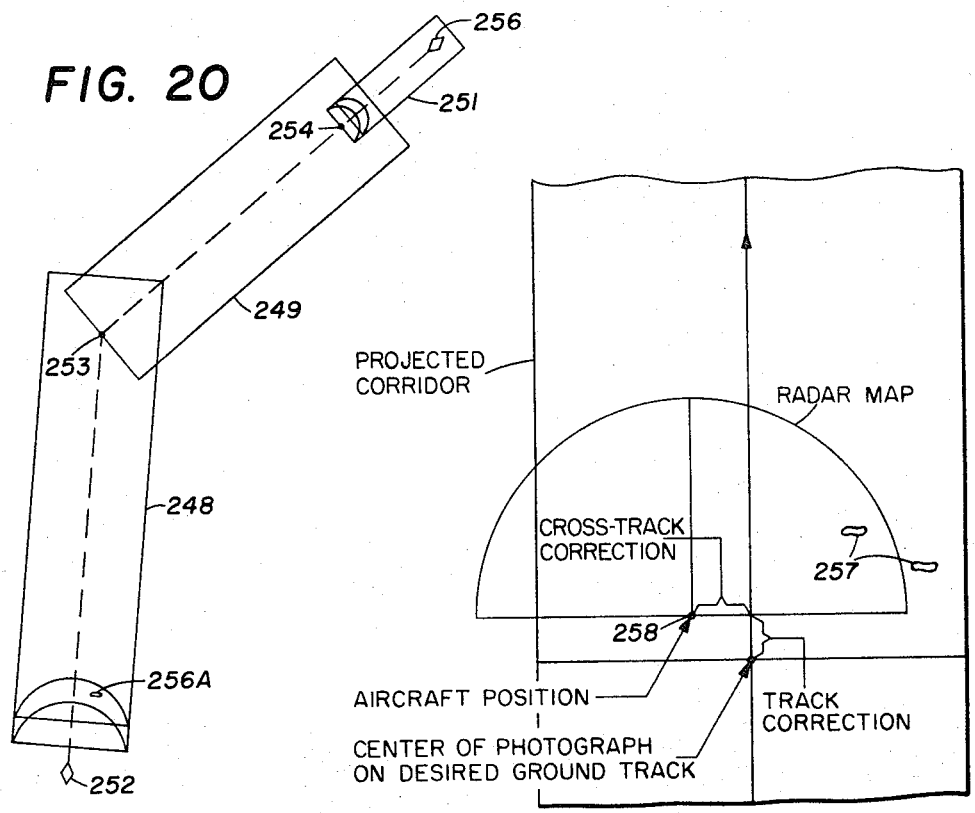
FIG. 20
FIG. 21
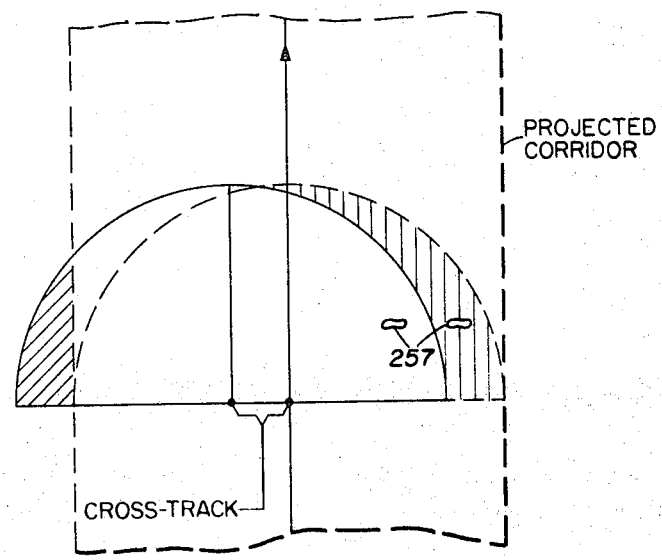
FIG. 22

MOVING AND HARD TARGET INDICATOR

This invention relates to a moving and hard target display system, and more particularly to an area moving target indicator (MTI) display system wherein the differences between mirror image patterns are color coded for ease of interpretation.

A radar system employing area MTI must resolve moving targets from the surroundings (ground clutter) by means of brute-force high-resolution radar parameters. This is in contrast to radar systems that detect and present moving targets through coherent or noncoherent doppler processing. In area MTI systems, the resolution must be sufficient to provide the necessary resolving power over the required or useful operating range as dictated by the particular application, and must also enhance the target-to-clutter signal ratio by illuminating a small ground patch area. Area moving target systems have not been appropriate for fixed wing aircraft radar systems since normally the antennas employed in such systems are better suited for noncoherent signal processing for MTI capability and do not have the high resolution necessary for area MTI.

The display system of this invention is to be employed with any suitable high resolution radar having a fast scan rate. A given area and its mirror image are displayed simultaneously on the same direct view storage tube (DVST) and viewed through an optical system such that differences between the two displays are color coded. For airborne operations, controls are provided to the horizontal and vertical deflection yokes of the DVST for ground-track and cross-track stabilization of the system to assure that on successive scans of the antenna, the two displays remain in coincidence. A ground track control orients the center radius of the 180° displays to the true ground track as observed on the display and a ground velocity stabilizing control readjusts the rate of display center movement across the face of the DVST proportional to ground velocity.

As a hard target indicator, the display system of this invention provides a high resolution background map and the hard target signals displayed simultaneously on opposite 180 degree sectors of a direct view storage tube. The hard target signals are adjusted to emphasize only those targets of interest to the operator. When viewing the high resolution radar map and the hard target map through a color coding optical system, the hard targets stand out as white areas against the colored radar map background. Thus, it is an object of this invention to provide a system for moving target indication and hard target indication.

In another embodiment of this invention, aerial photographs are projected onto one 180° sector of the DVST for correlation by means of an optical system with a high resolution radar map or a hard target map generated on the opposite 180° sector of the display tube. Such a system provides a capability of navigation and hard target identification by means of aerial photography. Again, stabilization of the radar map is provided as explained previously. In this embodiment, certain fixed targets are identified in the aerial photograph by comparison with the radar map. For navigational purposes, the radar map is correlated with the aerial photograph by an operator adjusting the stabilization controls. The amount of adjustment required is an indication of flight path deviation from an established course.

The invention is specifically set forth in the appended claims and provides a moving and hard target radar display system including a means for visually displaying a radar map and its mirror image, means for selecting the area to be scanned and for controlling the position and ground stabilizing said radar map, and optical means for viewing both displays simultaneously and color coding the differences therein.

A more complete understanding of the invention and its advantages will be apparent from the specification and claims and from the accompanying drawings illustrative of the invention.

Referring to the drawings:

FIG. 20 is an illustration of a typical aerial photo corridor centered on the desired ground track against which the radar map is compared as a means of precision navigation;

FIG. 21 is an illustration of typical cross-track and along-track errors between the projected photographic corridor and the radar 180° sector map; and FIG. 22 is a plan view showing area covered by a radar display superimposed on a displayed sector of an aerial photograph to the same scale illustrating misalignment in cross-track.

Figure 1A:
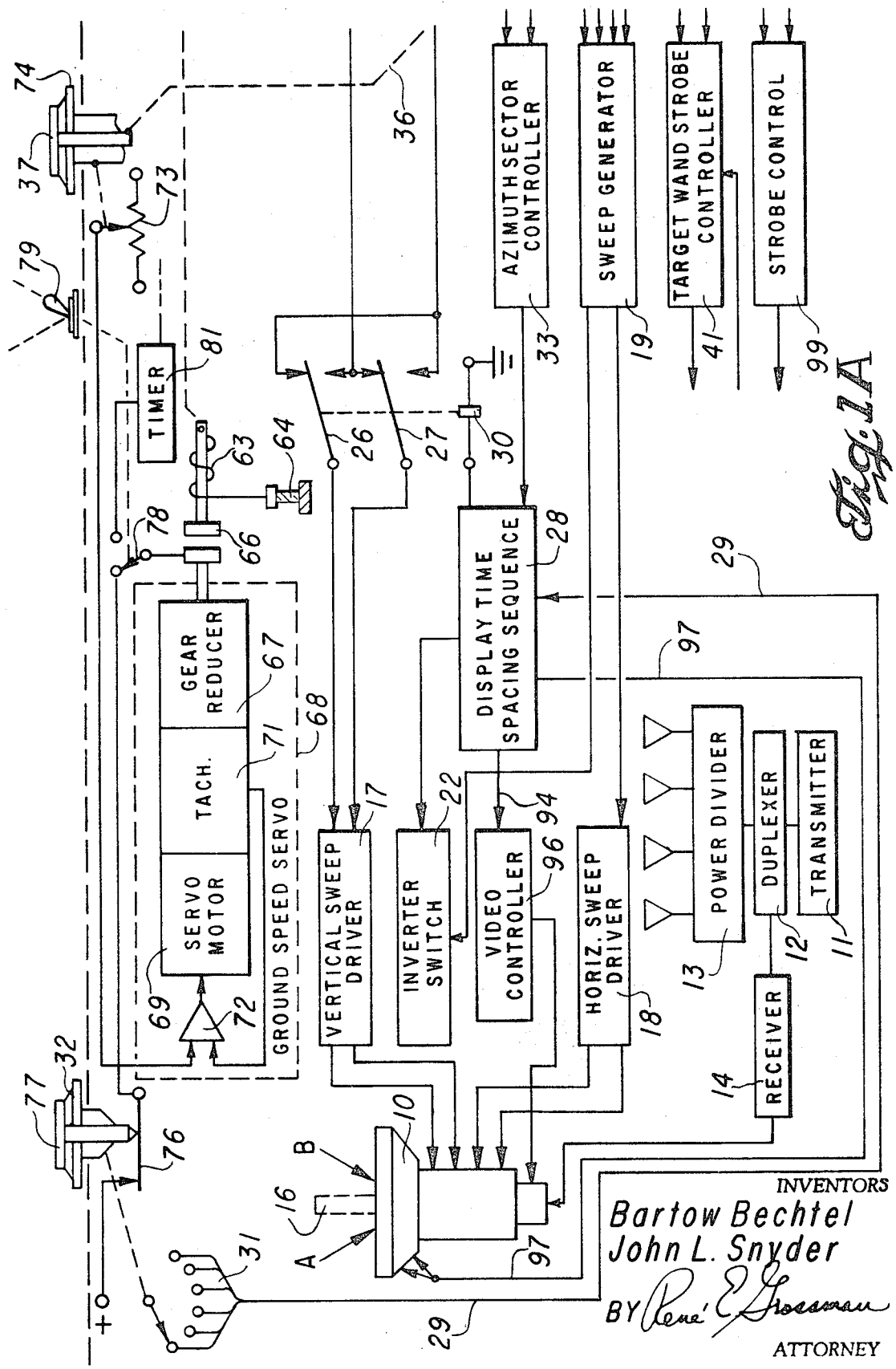
FIG. 1 (composed of FIGS. 1A and 1B) is a schematic of an airborne moving target radar display system with vertical axis velocity stabilization.

Referring to FIG. 1, there is shown a moving target display system wherein a radar map and its mirror image are displayed simultaneously on a direct view storage tube 10. Radar signals representing the displays on the storage tube 10 are generated in a radar system a simplified block diagram of which includes a transmitter 11 coupled through a duplexer 12 to a linear antenna array by means of a power divider 13. Pulses received by the antenna array are transmitted through the duplexer 12 to a receiver 14 wherein they are characterized into video signals connected to the storage tube 10. Radar systems are adequately described in the literature, for example, a book by Merrill I. Skolnik entitled "Introduction to Radar Systems," McGraw-Hill, and no more than a general representation of such a system is shown in FIG. 1. The display tube 10 is basically an intensity modulated cathode ray tube, an example of which is the ppi scope. It is normally dark in the absence of a target with a target being indicated by intensifying the beam and presenting a luminous spot on the face of the DVST. Unfortunately, in addition to the beam being intensified by a target, it is also intensified by ground clutter making target identification difficult.

Figure 2A:
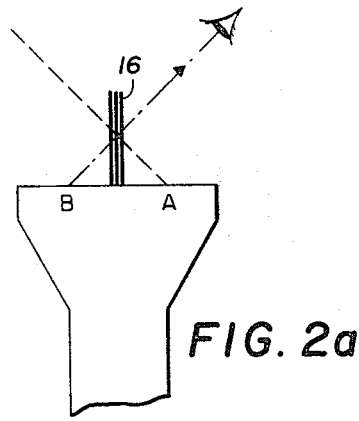
FIGS. 2a and 2b are side and plan views, respectively, of a dichroic beam splitter in relation to the viewing face of a direct view storage tube.
Figure 2B:
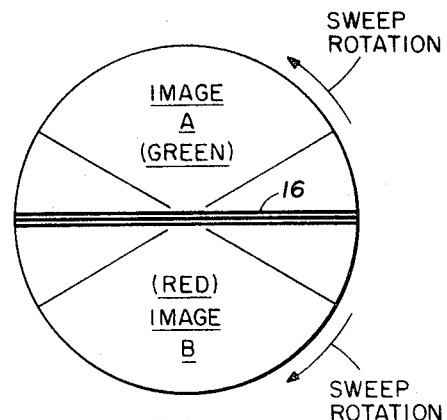
Figure 3:
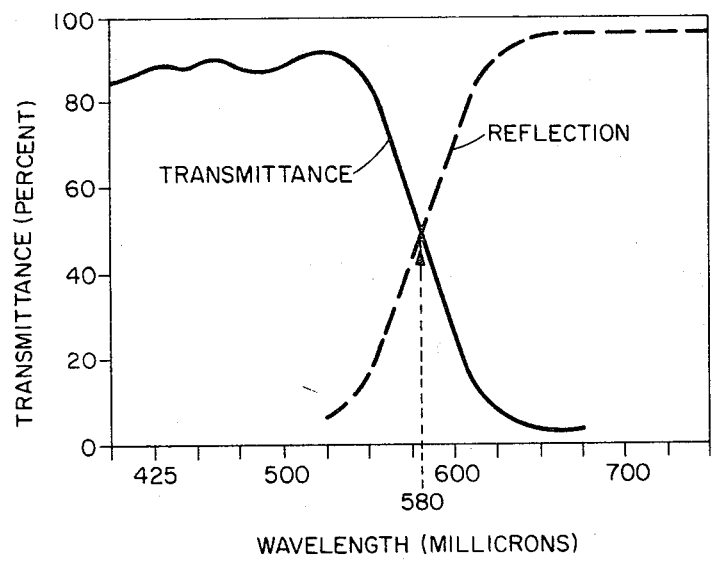
FIG. 3 is a plot of percentage transmission and reflection versus wavelength for the dichroic beam splitter of FIG. 2.

To improve the discernability of a moving target from the surrounding ground clutter, a simple optical comparator 16 is used for a comparison of two time spaced radar maps displayed simultaneously on the storage tube 10. This comparator consists of a dichroic beam splitting mirror erected orthogonal to the surface of the DVST, and along a diameter separating the two radar maps as shown in FIGS. 2a and 2b. The dichroic beam splitter 16 transmits blue and green and reflects red and yellow and as shown is designed for viewing at an angle of approximately 45°. Referring to FIG. 3, there is shown the transmission and reflection characteristics of a typical dichroic mirror. If a P–4 white phosphor, which has fairly good spectral energy distribution over the visible spectrum, is used with the storage tube 10, the observer sees a transmitted image through the mirror of a thoroughly saturated green hue, and a similar reflected red image. Where the phosphor is simultaneously illuminated on both sides of the beam splitter 16 with similar but mirror image displays, the spectrum recombines such that to the observer there appears the original white image. If a spot exists on one side of the beam splitter 16 and not on the other, this particular spot appears either red or green, depending on whether it is transmitted or reflected by the mirror. Thus, if on the top sector of the storage tube 10 a 180° section image A is painted during one scan of the antenna array, and at some selected time delay later a mirror image of that same geographical sector is painted on the bottom half of the tube, image B, the observer sees a white map, providing the two images are in proper registration. As mentioned, any signals (targets) now appearing on one side and not on the other will be displayed as either red or green, depending on whether they are transmitted or reflected from the beam splitter 16. The mirror image map is easily obtained by simply reversing the direction of the ppi scan during that 180° period and simple timing circuits perform the video angle gating and sweep direction control as will be explained.

Vertical deflection of the sweep is controlled by means of a vertical sweep driver 17 connected to the deflection yokes of the storage tube 10 for both the top and bottom 180° sections. Horizontal sweep control is provided by means of a horizontal sweep driver 18 connected to the deflection yokes of both 180° sectors. Both the horizontal and vertical sweep voltages are generated by a sweep generator 19 coupled to a transolver 21. In the system of FIG. 1, the horizontal sweep voltage is applied directly to the appropriate deflection yoke through the driver 18. The vertical sweep voltage, however, is coupled to the vertical driver 17 through an inverter switch 22 and modified by means of centering control voltages generated at the wiper arm of centering potentiometers 23 and 24. The centering voltages are transmitted to the vertical driver 17 through a pair of switches 26 and 27 operated from a solenoid 30. Control of the inverter switch 22 and the solenoid 30 is in accordance with a trigger signal generated by a display time spacing sequencer 28. The display time sequencer 28 is an arrangement of logic circuit components to produce a sequence of trigger signals controlled by a frame rate voltage on line 29 the magnitude of which varies by positioning the wiper arm of a frame rate selector switch 31 mechanically connected to a frame rate selector control knob 32. Timing of the trigger signals from the display sequencer 28 is determined by an azimuth sector controller 33 connected to an azimuth synchro 34.

A mechanical connection 36 interconnects the input shafts of the transolver 21 and the azimuth synchro 34 to a display and ground track orientation control knob 37. The orientation control knob 37 is mechanically connected to drive the transolver 21 to properly phase displace the vertical and horizontal sweep voltages to display an area around a selected ground track. Control knob 37 also positions the input shaft of the azimuth synchro 34 to activate the azimuth sector controller 33 to properly time sequence the signals generated by the display sequencer 28. A connection also exists from the control knob 37 to a target wand synchro 38 through a mechanical differential 39. Also connected to the mechanical differential 39 is a range azimuth adjustment control knob 40 coaxially mounted with a target wand control 35 coupled to the wiper arm of a wand range potentiometer 45. Potentiometer 45 supplies a voltage signal to a target wand strobe controller 41. The target wand synchro 38 is coupled to the target wand strobe 41 which in turn connects to the video mixer circuit in the receiver 14. A target wand is merely a high intensity line trace to aid the observer in maintaining location of targets displayed on the storage tube 10.

For an airborne area moving target display system, the radar maps must be directional (azimuthal) and ground velocity stabilized. Azimuth stabilization assures that on successive scans of the antenna, over a point target near the periphery of the display, the target's position on the indicator varies by an acceptable amount. It is important for proper color discernability that the same display is repeated for successive scans.

In the system of FIG. 1, display stabilization is provided by means of a directional compass 42 and a series of tandemly interconnected synchros 43, 44, and 46.

Where the antenna array is part of a helicopter rotor, the synchros 43, 44, and 46 are synchronized with the operation of the helicopter rotor 56. The directional compass 42 includes a gyro 47 having a vertical axis coupled to a 400 Hz synchro 48 and a gyro synchro 49. Since a standard directional gyro-flight instrument can be used for the directional compass 42, other controls, such as the torquer 51, may be coupled to the gyro 47 for control functions independent of the display system. The 400 Hz signal of the synchro 48 energizes a repeater servo 52 having an output shaft coupled to a repeater synchro 53. Output voltages generated by the repeater synchro 53 energize the synchro 43 which in turn produces control voltages to the azimuth synchro 34, and the target wand synchro 38 through an isolation amplifier 54. The output signals of the synchro 43 are synchronized with rotation of the rotor mounted antenna 56. Thus, the master timing pulse to the display sequencer 28 is controlled by a compass direction and antenna position to always occur at a time set by the orientation knob 37 to assure the same area is displayed on subsequent paints.

The azimuth stabilization control chain includes the gyro synchro 49 coupled to the synchro 44 which in turn is connected to the transolver 21. A 10 KHz source 57 provides an excitation voltage to the synchro 46, the gyro synchro 49, and a relative bearing controller 58. The relative bearing controller 58 generates a signal to display aircraft relative heading on the DVST. Normally, the switch 59 is in the position shown to complete the azimuth control chain between the synchro 44 and the gyro synchro 49.

Figure 4:
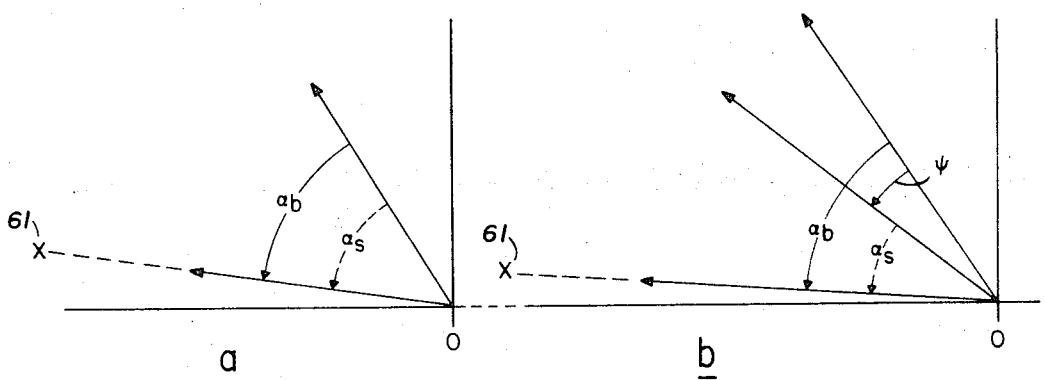
FIG. 4 are vector diagrams showing azimuth stabilization angles.

Azimuth stabilization geometry is illustrated in FIG. 4. Illustration $a$ has been drawn with the gyro 47 and the cab heading, assuming a helicopter mounted system, coincident to show zero yaw angle orientation. Antenna position and the display center are also shown coincident and aligned to a ground target 61. There are three angles involved in azimuth stabilization; the angle between antenna position and gyro heading ($\alpha_b$), the angle between the display center line and the cab heading ($\alpha_s$), and the yaw angle ($\Psi$), that is, the difference between the gyro direction and the cab heading, which in illustration $a$ is zero. Illustration $b$ of FIG. 4 depicts a situation where the yaw angle is not zero, that is the gyro and cab headings do not coincide. If the angle between the gyro heading and the ground target, $\alpha_b$, is unchanged, then:

$$\alpha_s = \alpha_b - \Psi \tag{1}$$

The synchro chain for generating $\alpha_s$ was described earlier to include the transolver 21, the synchro 44, and the gyro synchro 49. Since the angle between the gyro heading and the cab heading is the yaw angle, the output of the gyro synchro 49 is proportional to the magnitude of the yaw. If the position of the rotor antenna 56 is the angle $\alpha_b$, then the output of the synchro 44 is proportional to angle $\alpha_s$ as given by the equation above. The transolver 21 generates the sine and cosine of the angle $\alpha_s$ at a time determined by the setting of the control knob 37 to display the desired target area.

A relative heading strobe is generated and displayed on the tube 10 by means of a strobe control 99 coupled to the output of a strobe synchro 100 having a locked input shaft and connected to the synchro 46 whose input shaft represents the angle $\alpha_b$. The relative heading strobe visually displays the angle between the display center and the actual cab heading.

Figure 5:
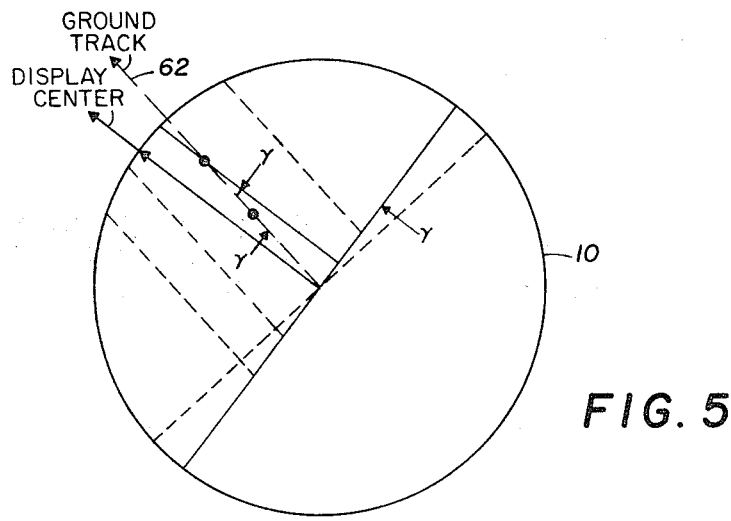
FIG. 5 is a diagrammatic explanation of ground track stabilization.

The transolver 21 of the azimuth synchro stabilization control chain also provides for ground-track stabilization of the displays on the storage tube 10. This is an inherent function of the azimuth control chain in the system of FIG. 1. The effect of ground-track control can best be understood by referring to the ground-track geometry of FIG. 5. Here the 180° display sector has an arbitrary orientation, and the center radius of the display has been aligned with the display ground track. The actual ground track is indicated by the dashed vector 62 and shows a resultant angular ground track error ($\gamma$) relative to the display orientation. Hence a target or rather all targets and clutter will move across the face of the display tube 10 in the direction of the actual ground track. In the system of FIG. 1, the magnitude of this cross track component depends upon the time spacing between image A and image B, the range scale of the display, the ground speed of the aircraft, and the magnitude of the ground track error. Assume the display of FIG. 5 is velocity stabilized, to be discussed, so that the map is stationary on the face of the tube, then the cross track component is a lateral displacement to the left or right, depending on the direction of the actual ground track relative to the display center. This cross track component, when it is of sufficient magnitude, will appear on the display as a color fringe, in the lateral direction, where on successive paints the fringe will change from red to green to red, etc., due to the alternate reflection or transmission of the error by the dichroic beam splitter 16. The relative angular position of the display can be adjusted by means of the control knob 37 to minimize this fringing and bring the two displayed images into sharp registration.

Velocity stabilization of the display moves the center of the sector ppi along the established ground track at a rate proportional to ground velocity. The control loop for ground stabilization includes the centering potentiometers 23 and 24 having wiper arms mechanically connected to a rotating shaft 63 biased to return to a fixed angular position by means of a flyback stop 64. A clutch 66 couples the shaft 63 to a gear reducer 67 of a ground speed servo 68. Driving the gear reducer 67 is a servo motor 69 the speed of which is measured by a tachometer 71. The servo motor 69 is of a variable speed type and energized by the output voltage of a servo amplifier 72. The output of the amplifier 72 is proportional to the difference between a voltage representative of actual motor speed as generated by the tachometer 71 and a voltage representative of desired motor speed as set on a ground speed potentiometer 73. Potentiometer 73 includes a wiper arm mechanically connected to a ground speed control knob 74. Thus, it can be seen that the RPM of the shaft 63 can be varied by means of the ground speed control knob 74. The clutch 66 is energized from a voltage source (not shown) through a reset switch 76 coupled to a manual reset control button 77. To reset the centering potentiometers 23 and 24, the manual reset control knob 77 is actuated to de-energize the clutch 66. De-energizing the clutch 66 permits the flyback stop 64 to rotate the shaft 63 to its starting position. The clutch 66 can be automatically reset by means of a two-position switch 78 coupled to a reset lever 79. With the lever 79 in the position shown, the clutch 66 is manually reset by means of the control knob 77. When the lever 79 is in the automatic position, the clutch 66 connects to an automatic reset timer 81. The reset timer 81 automatically deenergizes the clutch 66 at periodic intervals to return the display center to its starting position.

Figure 6:
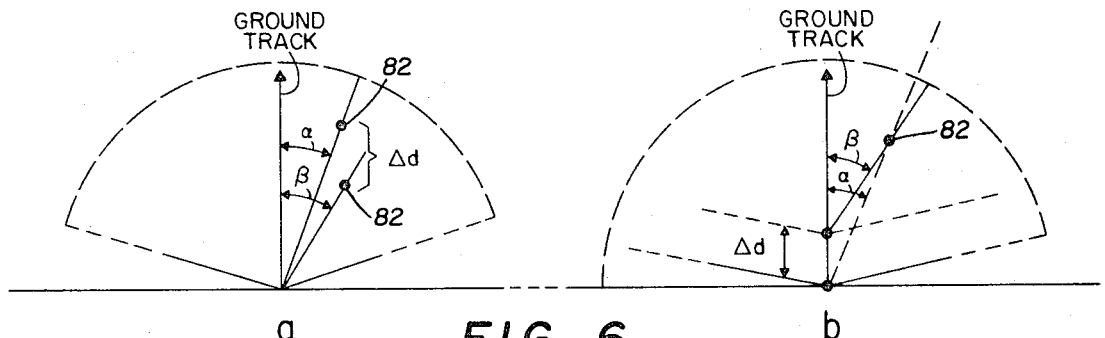
FIG. 6 is a diagrammatic explanation of velocity compensation.

Ground track velocity stabilization is best described by referring to FIG. 6 in which it is assumed that the display has been ground track oriented. Illustration a of FIG. 6 shows an unstabilized condition wherein the position of a fixed target 82 subtends an angle α relative to the ground track. The aircraft proceeds in the direction of the ground track and the target 82 moves down the scope parallel to the ground track in subsequent displays and at some time period later, Δd subtends an angle β. Illustration b shows that the integrity of the display is maintained if the sector center of the ppi is displaced by an amount Δd to maintain the fixed target 82 stationary on the display tube 10. The angles α and β are the same in illustration b as they were in illustration a.

Figure 7:
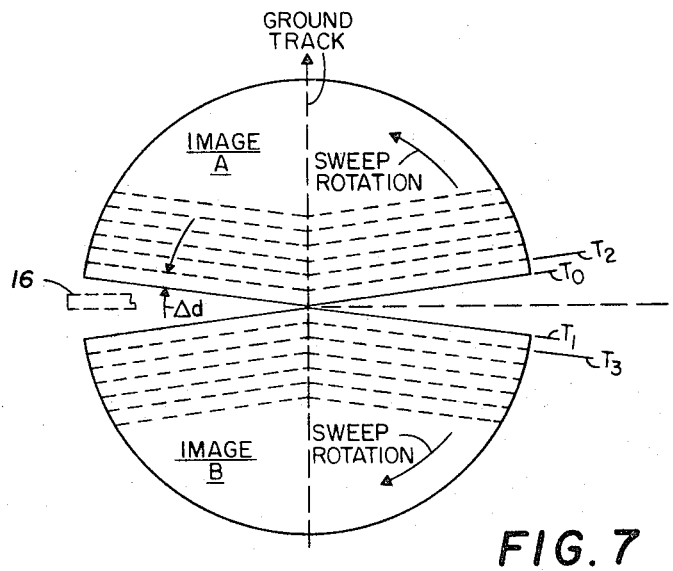
FIG. 7 is a diagram showing the center position of successive paints of a given area as the result of velocity stabilization.

FIG. 7 shows the sequential programming of the display center for the time sequence of images A and B displayed between reset pulses. If the centering displacement of the images is at a rate equal to the ground velocity of the aircraft, then the fixed target 82 remains in a given area of the display and images A and B remain in sharp registration and little if any fringing or defocusing is observed. Any fringing or defocusing is removed by simply trimming the potentiometer 73. On each subsequent sweep in a given sector, the display must be displaced by an amount Δd as shown by the series of dotted lines in FIG. 7. It is apparent that for each subsequent image, the area displayed on the tube 10 is reduced, however, adequate time is available to locate most targets.

Figure 8:
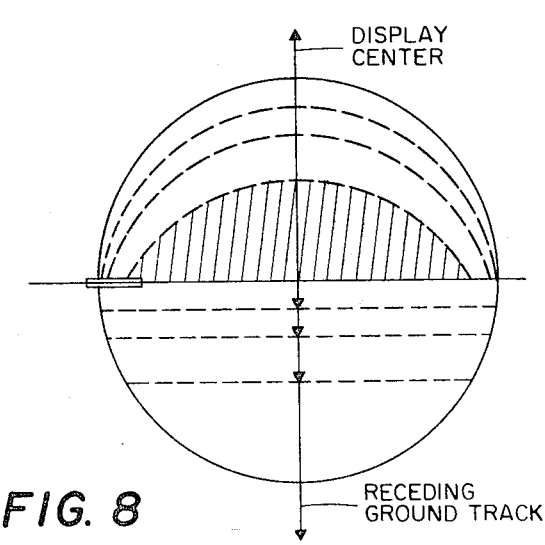
FIG. 8 is a diagrammatic showing receding display velocity stabilization.

If the radar antenna is part of a helicopter rotor, the area under surveillance to be displayed on the tube 10 can be either fore or aft of the aircraft. When viewing an area receding from the aircraft, the velocity stabilization must be in the reverse direction to that shown in FIG. 7. Reverse velocity stabilization is provided by means of energizing a solenoid 86 to position a pair of switches 87 and 88 to reverse the polarity of the voltage connected to the centering potentiometers 23 and 24. The solenoid 86 is energized through a switch 89 mechanically coupled to a lever 91. The potentiometers 23 and 24 are connected to a D.C. voltage source 92 having a range scale adjustment 93 to vary the magnitude of Δd in accordance with the range displayed in images A and B. FIG. 8 is a sketch showing the movement of the display center when observing an area receding from the aircraft. The display center again is displaced by an amount Δd to maintain both images in good registration.

Actual painting of the displays on the direct view storage tube 10 is controlled by a blanking trigger on a line 94 generated by the time sequencer 28. This blanking trigger actuates a video controller 96 to energize the electron gun of the display tube 10. It is also necessary to erase the images A and B from the display tube 10 in proper sequence with the painting thereof. There are two techniques for erasing a DVST display, one continuously erases the image and the second erases the image in discrete steps. Where a conventional DVST is used, the erase function of the display tube is common to both images thereby requiring a conventional continuous erase method. This means as soon as an image is painted, the intensity commences to decay exponentially. The time constant of this exponential decay is set principally by the maximum time spacing between successive image paints as limited by "color bias" effects, to be explained. Since continuous erase techniques are conventional, little in the way of system description will be given.

Figure 9:
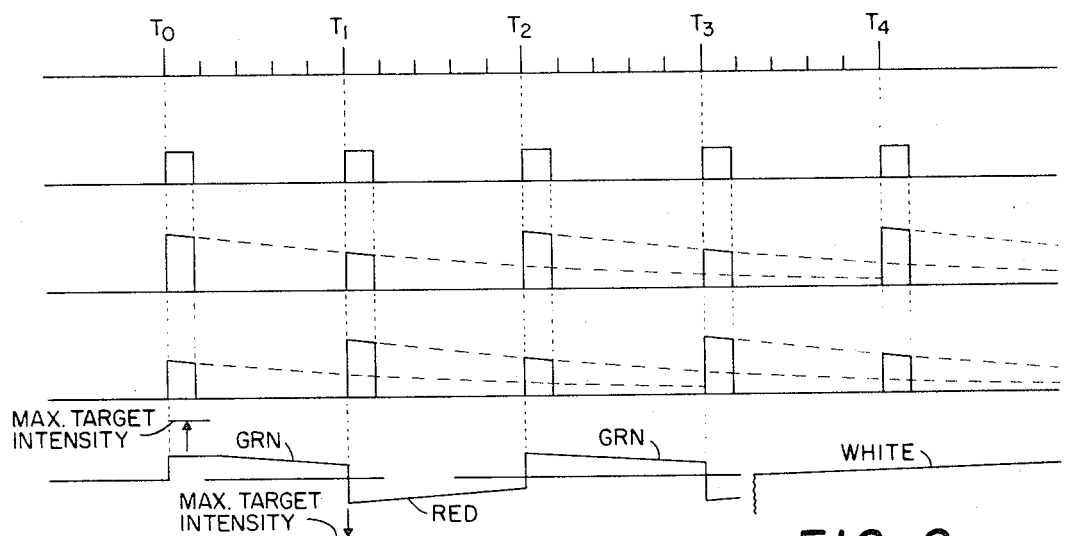
FIG. 9 is a graph of image intensity on the display tube of FIG. 1 using a continuous erase technique.

Referring to FIG. 9, there is shown a timing sequence generated by the master timing signals for a continuous erase function. One timing pulse from the time sequencer 28 is generated for each revolution of the antenna and 20 are shown across the top line. An arbitrary selection of five pulses (one pulse for each rotor revolution) has been selected as the elapsed time between subsequent image paints. About six-tenths of 1 second is believed to be about the maximum time delay possible between images when using a continuous erase system. The video will be gated on only for the time required to complete one image at timing pulses $T_0$, $T_1$, $T_2$, etc. Video gating pulses are shown in line 2 for both image A and image B. The height of the image intensity waveform, lines 3 and 4, represents the intensity of any particular point on the image; the dotted exponential depicts the intensity of decay with time. It can be seen that if a small patch of clutter is painted at time $T_0$ on image A, its intensity has decayed to about 60 percent of its initial value at time $T_1$ at which time the same patch is painted on image B at full intensity. This will cause a "color bias" in the red direction, where the color is determined by the difference of intensity of a given spot appearing on both images. However, all stationary objects appearing on the image, namely ground clutter, have this color bias effect. At time $T_2$ the color bias reverses from red to green since now the clutter on image A is at full intensity while that on image B has decayed. A moving target, which during the frame period has generated sufficient displacement on the display tube 10 to have no counterpart on the previous stored image, will appear at full intensity as shown on the bottom line of FIG. 9. Thus, the time spacing between paints is selected for maximum discernability of moving targets against the color bias. Of course, the moving target also decays exponentially but will be visible at the time of a succeeding paint where it then changes to the opposite color.

Figure 10:
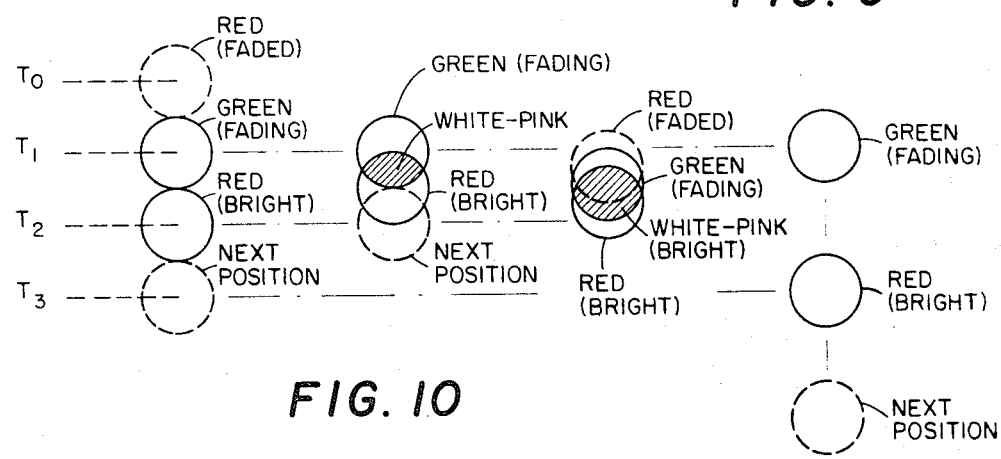
FIG. 10 shows a sequence of target displacement and the color coding using a continuous erase technique.

Referring to FIG. 10, there is shown the effect of target displacement using a continuous erase technique. In column A, a target is shown in successive scan frames starting with $T_0$ through $T_3$ and moving from top to bottom. Assume that a red image has just been painted at time $T_2$. The previous position, slightly displaced, at time $T_1$ is green and fading to a low intensity, however, still visible. An image painted at time $T_0$ has completely faded and is no longer visible. The next image to be painted will appear at time $T_3$ and will have a green hue. In the sequence of column A, it was assumed that the scale factor and target velocity was such that the target just displaced itself by its diameter between subsequent images. However, there obviously can be any number of spacings and overlap combinations as shown by the remaining three columns of FIG. 11. The combinations shown in the remaining columns are of different degrees of overlap and spacing showing theoretically the color patterns to be expected. Since the flash of color actually attracts the eye, it can be seen that even with a continuous erase technique, moving targets are easily discernible.

Figure 11:
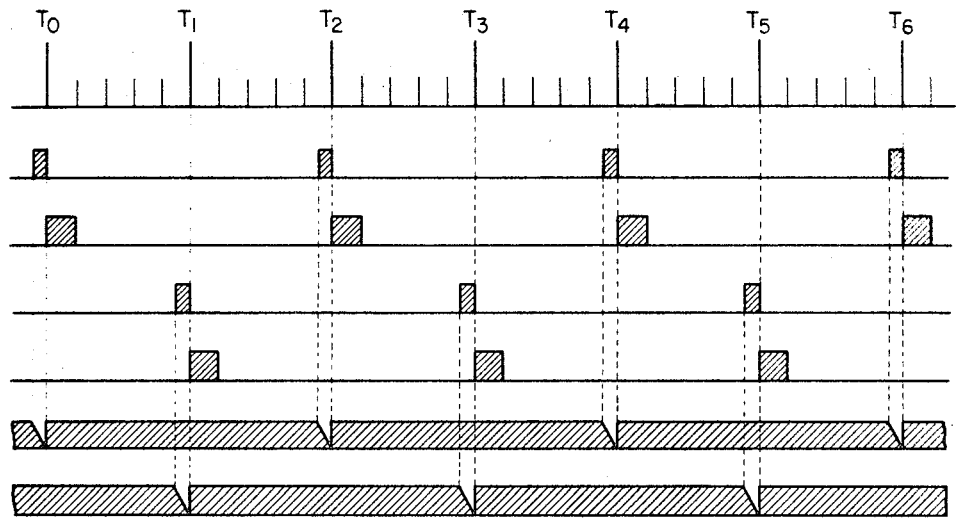
FIG. 11 is a graph of timing intervals of a discrete erase technique for a special version of the display tube of the system of FIG. 1 which employs two independent storage meshes.

In order to improve the discernability of slow moving targets, the discrete erase technique is preferred. For the discrete erase technique, the storage tube 10 includes two storage meshes, of a type well known in the art, one for image A and a second for image B, where a discrete erase pulse is applied to each independently. In the system of FIG. 1, these discrete erase pulses are generated by the display time sequencer 28 and connected to the storage meshes by means of a line 97. Although this technique is similar to the continuous erase method previously described, it has the advantage that the storage tube voltages may be optimized for long image storage. This essentially eliminates or at least minimizes the color bias problem encountered in the continuous erase technique. As in the continuous technique, the timing pulses will be derived from the azimuth sector controller 33 in response to antenna rotation. The timing relationships are shown in FIG. 11 with the timing pulses again represented on the first line. A discrete erase pulse is generated immediately preceding the updating scan on one sector of the display tube 10. The duration of the erase pulse is very short with respect to the updating interval. During the updating interval there may be a transient color bias, but due to its very short duration when compared to the display time, it is barely perceptible. FIG. 11 is somewhat self-explanatory, immediately before time $T_0$ an erase pulse is generated to erase image A and immediately following, a video pulse is generated to paint another image A. Immediately prior to time $T_1$ an erase pulse is generated to erase image B and immediately following, a video pulse starts painting a new image in this sector. The actual amount of time each sector displays an image is shown by the shaded portions of the lower two lines of FIG. 11. Note that the erase time is very short in relation to the display time.

Figure 12:
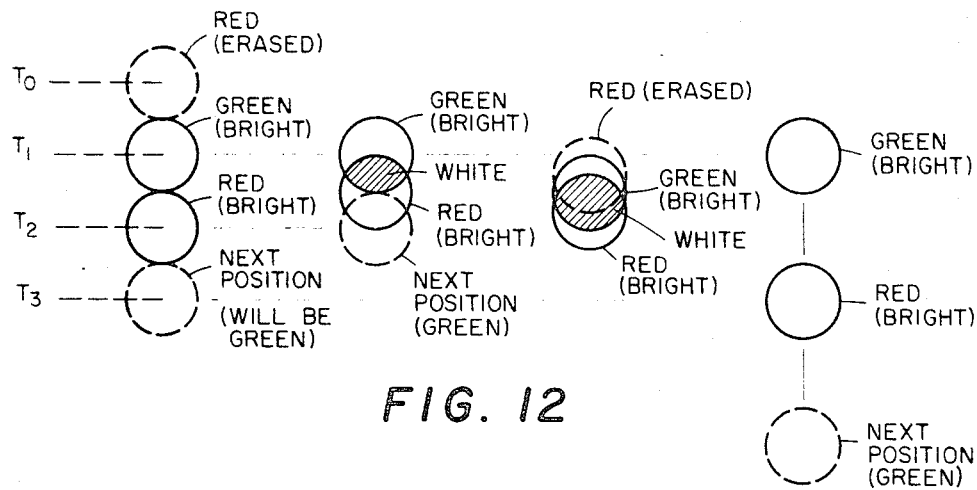
FIG. 12 shows a sequence of target displacement and color coding using a discrete erase technique.

Referring to FIG. 12, there is shown the effects of target displacement using a discrete erase technique. This FIGURE is similar to FIG. 10 which illustrated the effects of target displacement using a continuous erase technique. In column A of FIG. 12, a target is shown in successive scan frames starting with $T_0$ and continuing through $T_3$ and moving from top to bottom. Assume that a red image has been painted at time $T_2$, with the discrete erase technique, an image at the previous position, slightly displaced, at time $T_1$ is still a bright green. Thus, with the discrete erase technique, the images at time $T_1$ and time $T_2$ are both approximately the same degree of brightness whereas with the continuous erase technique the image at time $T_1$ was fading. As a result the discrete erase technique offers greater discernability of moving targets and permits increased time space between scans to improve the detection of slow moving targets. Continuing with column A, an image painted at time $T_0$ has been erased and is no longer visible. The next image to be painted will appear at time $T_3$ and will have a green hue. In the sequence of column A, it was assumed that the range scale factor and target velocity was such that the target just displaced itself by its diameter between subsequent images. The combinations shown in the remaining columns are of differing degrees of overlap and spacing showing theoretically the color patterns to be expected. Note that where two bright images overlap, the overlap portion appears in white and not pink or green as in the continuous erase technique. Again, the two images are approximately the same degree of brightness thereby enhancing the ability of an observer to detect a moving target.

Figure 13A:
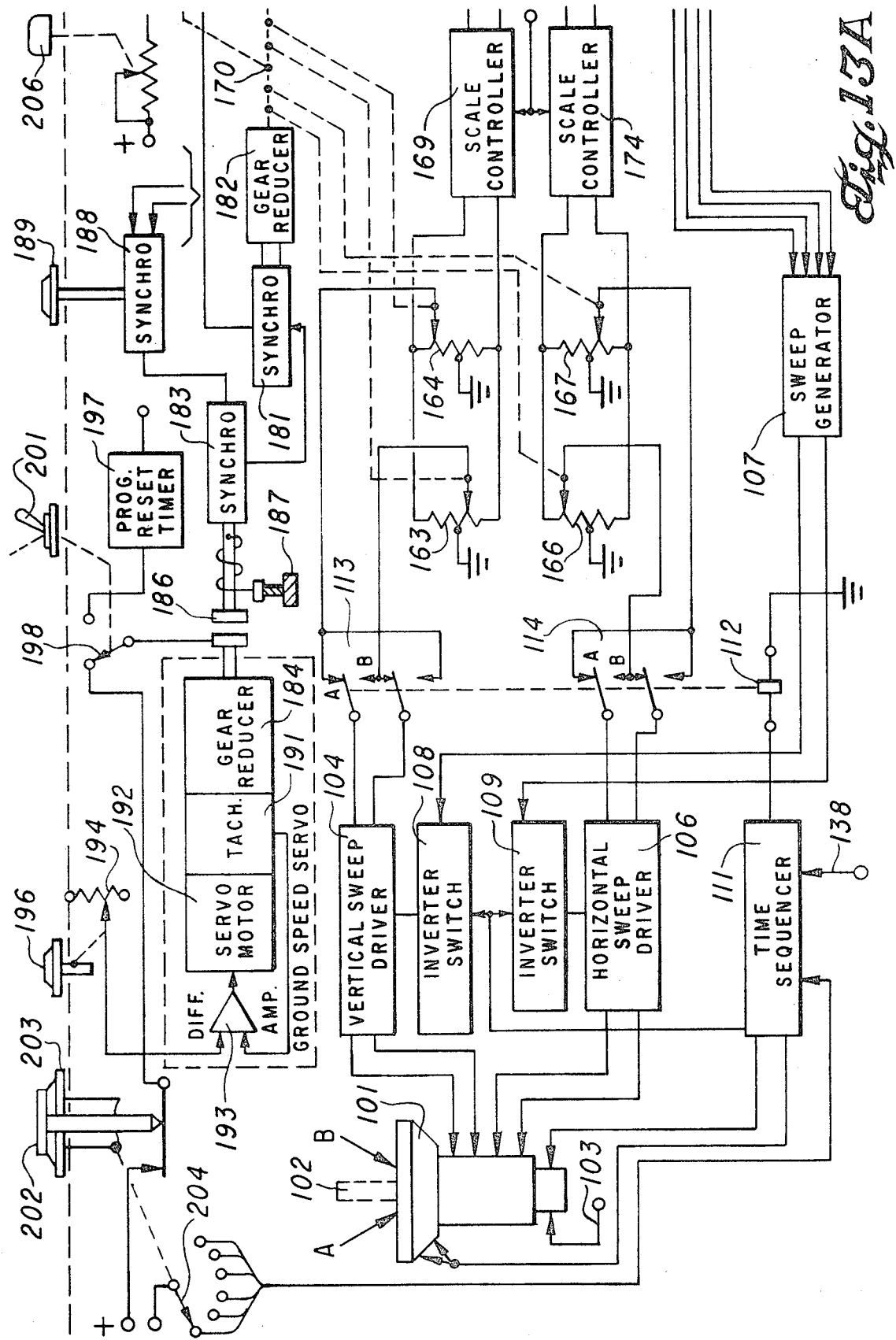
FIG. 13 (composed of FIGS. 13A and 13B) is a schematic of a moving and hard target display system employing two-axis stabilization.
Figure 13B:
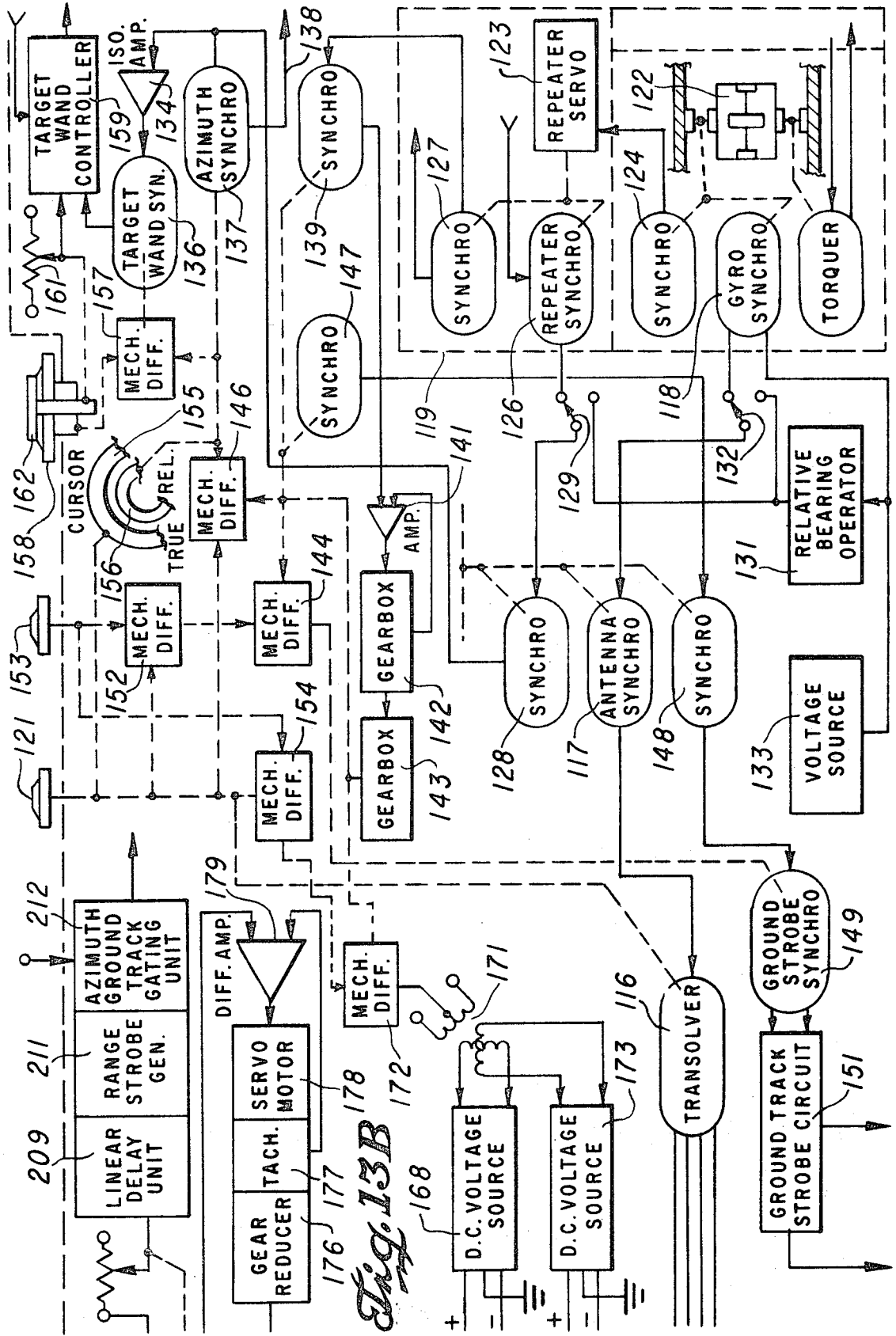

In the system of FIG. 1, images A and B were stabilized only along the vertical axis. Referring to FIG. 13, there is shown a two-axis stabilization system for off ground-track orientation wherein a direct view storage tube 101 displays an image A on one sector and a mirror image B on the opposite 180° sector. A dichroic beam splitter 102 is positioned orthogonal to the display face of the tube 101 at a diameter located between image A and image B. Video radar signals will again be supplied from the receiver of a radar system, such as shown in FIG. 1, to a line 103. A vertical sweep driver 104 connected to the vertical deflection yokes of the tube 101 controls the vertical deflection of both images A and B. A horizontal sweep driver 106 connects to the horizontal deflection yokes to control the horizontal sweep of the images. A sweep generator 107 supplies the vertical sweep voltage to the sweep driver 104 through an inverter switch 108 and a horizontal sweep voltage to the horizontal driver 106 through an inverter switch 109. Inverter switches 108 and 109 are triggered from a non-inverting to an inverting condition by means of a trigger pulse generated in a time sequencer 111. The time sequencer 111 also supplies an unblanking gate signal to the electron gun of the tube 101 and discrete erase pulses to the display meshes for both images A and B. A signal from the time sequencer 111 also energizes a solenoid 112 thereby actuating two pairs of tandemly connected switches 113 and 114 from position A to position B.

A transolver 116 supplies a sine and cosine varying voltage to the sweep generator 107 to properly sequence the vertical and horizontal sweeps to form a PPI type display. As was described with reference to the system of FIG. 1, the transolver 116 is part of a synchro chain including an antenna synchro 117 and a gyro synchro 118, the latter a part of a directional compass 119. A display orientation control knob 121 determines the shaft position of the transolver 116; the shaft position of the antenna synchro 117 is synchronized with rotor position; and the shaft position of the gyro synchro 118 is coupled to the shaft of a gyro 122. Again, the assumption is that the radar antenna will be mounted in the rotor blade of a helicopter or an equivalent confirugation. This synchro chain operates in a manner similar to that described previously with reference to FIG. 1 to properly orient the display to a desired target area.

Included as part of the directional compass 119 is a followup repeater having a repeater servo 123 connected to a 400 Hz synchro 124 coupled to the shaft of the gyro 122. Repeater servo 123 positions the input shaft of a repeater synchro 126 and a synchro 127 in accordance with the gyro heading. An output signal from the repeater synchro 126 supplies an energizing voltage to a synchro 128 through a switch 129. The synchro 128 also receives an energizing voltage from a relative bearing operator 131 through the switch 129. A voltage from the relative bearing operator 131 also energizes the synchro 117 through a switch 132. A voltage source 133 supplies excitation voltage to the relative bearing operator 131 and the gyro synchro 118. The shaft position of the synchro 128 is synchronized with rotor blade rotation to supply a voltage signal through an isolation amplifier 134 to a target wand synchro 136 and to an azimuth synchro 137. A line 138 couples the output of the azimuth synchro 137 to the time sequencer 111. The signal supplied by the azimuth synchro 137 is the master triggering pulse to synchronize the operation of the entire display system.

Synchro 127 of the followup repeater generates excitation voltages to a synchro 139 which supplies one of two input signals to an amplifier 141 in accordance with the position of its input shaft. An output signal from the amplifier 141 drives a motor-tachometer 142 having a shaft position proportional to the position of the gyro 122. The shaft of the motor-tachometer 142 is coupled to a gearbox 143 having an output shaft coupled to mchanical differentials 144 and 146 and the input shafts of the synchros 139 and 147. Synchro 147 supplies a stabilized energizing voltage to a synchro 148 coupled to the rotor shaft along with the synchros 117 and 128. The output voltage from the synchro 148 energizes a ground strobe synchro 149 having an input shaft tied to the differential 144 and supplies a voltage to a ground track strobe circuit 151. A ground track strobe is a high intensity light displayed on the images A and B to mark the ground track position. The output shaft position of the mechanical differential 144 is proportional to the difference between the output shaft position of the gearbox 143 and a differential 152. Differential 152 has two input shafts, one coupled to the display orientation control knob 121 and a second coupled to a ground track control knob 153.

In addition to coupling to the transolver 116 and the mechanical differential 152, the orientation control knob 121 is coupled to a mechanical differential 154, a true cursor 155, and the mechanical differential 146. The output shaft position of the mechanical differential 146 is proportional to the difference between cab heading and display center which is indicated on a relative cursor 156. A mechanical differential 157 and the azimuth synchro 137 are also coupled to the output shaft of the mechanical differential 146. A second input shaft of the differential 157 is tied to an azimuth control knob 158; its output shaft is connected to the synchro 136. Synchro 136 supplies a voltage proportional to the output shaft position of the differential 157 to a target wand controller 159 which is also tied to a range control potentiometer 161 coupled to a range control knob 162.

Whereas in FIG. 1 the display had vertical axis centering capabilities, the system of FIG. 13 provides both horizontal and vertical display centering. Vertical centering is provided by means of centering potentiometers 163 and 164 coupled to the vertical driver 104 through the switch 113. Horizontal display centering is provided by means of centering potentiometers 166 and 167 coupled to the horizontal driver 106 through the switch 114. Centering potentiometers 163 and 164 are tied to a D.C. voltage source 168 through a scale controller 169. A resolver 171 supplies excitation voltage to the D.C. source 168. It is by means of this resolver that off-axis velocity stabilization is achieved. A moving input winding of the resolver 171 is positioned by means of the output shaft of a mechanical differential 172 having two input shafts, one coupled to the output shaft of the gearbox 143 and the other to the output shaft of the differential 154. The second output winding of the resolver 171 connects to a D.C. voltage source 173 supplying voltage to the centering potentiometers 166 and 167 through a scale controller 174.

Two-axis ground speed stabilization of the display on tube 101 is provided by means of a mechanical linkage 170 interconnecting the wiper arms of the centering potentiometers 163, 164, 166, and 167 to a gear reducer 176. The gear reducer 176 is part of a range followup servo including a tachometer 177 and a servo motor 178 energized from a differential amplifier 179. Amplifier 179 generates a voltage proportional to the difference between a voltage from the tachometer 177 and a synchro 181 having a shaft position determined by a two-to-one gear reducer 182 coupled to the gear reducer 176. Energizing voltage to the synchro 181 is supplied by a synchro 183 having an input shaft coupled to the gear reducer 184 of a ground speed servo by means of a clutch 186. The shaft of the synchro 183 is biased to a starting position by means of a flyback stop 187. Energizing voltages to the synchro 183 are provided by means of a synchro 188 coupled to a manual centering control knob 189. Although automatic centering is provided by means of a ground speed servo, manual centering can be accomplished by means of the synchro 188.

The ground speed servo of FIG. 13 is similar to that described with reference to FIG. 1; it includes a tachometer 191 and a servo motor 192 energized from a differential amplifier 193. One input to the amplifier 193 is a voltage generated by a ground speed potentiometer 194 coupled to a ground speed control knob 196 calibrated in knots. Coupling and decoupling the ground speed servo to the synchro 183 can be accomplished automatically by means of a programmed reset timer 197 through a switch 198 coupled to a lever 201. Manual coupling and decoupling is controlled by a manual reset control knob 202 connected to the switch 198.

Coaxial with the manual reset control knob 202 is a frame rate selector control knob 203 mechanically coupled to a switch 204 for supplying preset voltages to the time spacing sequencer 111.

Also included in the system of FIG. 13 is range strobe control knob 206 coupled to the wiper arm of a potentiometer 207 in series with a potentiometer 208. The wiper arm position of the potentiometer 208 is controlled from the gear reducer 176 to supply a variable voltage to a linear delay unit 209. The linear delay 209 is coupled to a range strobe generator 211 in series with an azimuth ground track gating unit 212. The ground track gate signal connected to the unit 212 is generated by the ground track strobe circuit 151 coupled to the synchro 149. This subsystem provides a signal to the line 103 to display a high intensity beam with the images A and B.

Figure 14:
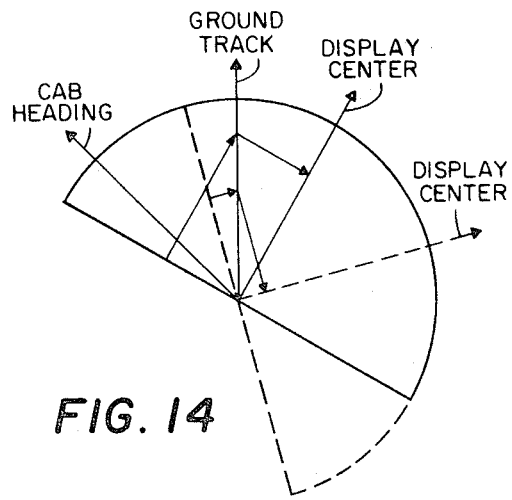
FIG. 14 is a diagrammatic showing the capability of a two-axis stabilization system to make the display orientation independent of the aircraft's ground track.
Figure 15:
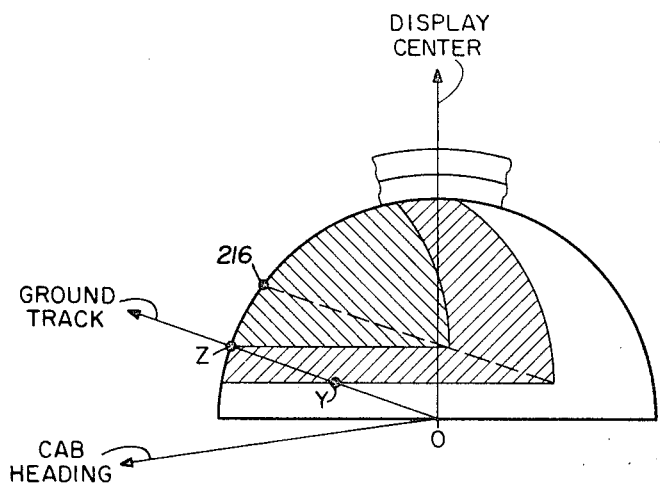
FIG. 15 is a diagrammatic explanation of two-axis movement of the display center.

To accomplish two-axis stabilization, the centering velocity vector is resolved into its vertical and horizontal components as shown in FIG. 14 for application to the vertical and horizontal deflection yokes of the storage tube 101. Again, velocity compensation takes place along the ground track as shown in FIG. 15. The display represented in FIG. 15 is programmed along the ground track toward point Z at the periphery. It is interesting to note that this mode of operation makes much more efficient use of the display area. For example, when the display center reaches point Y, which is one-half the display radius, the majority of the display area is still under observation. Centering displacement, as can be seen, can be taken all the way to the edge of the display at point Z where a useful percentage of the area can still be observed. So, under operating conditions which make desirable viewing time without recycling, the system of FIG. 13 has still another advantage. The ground track direction in the system of FIG. 13 is indicated by an electronic strobe on the display tube 101 generated by the circuit 151, while relative bearing and true bearing are indicated by movable cursors 155 and 156 at the periphery of the display, as shown. Ground track correction takes place independently of display orientation.

Referring again to FIG. 14, it can be seen that this type of system provides an effective side looking mode of operation, which may be very useful in certain applications. Both sides of the ground track may be covered by sequentially programming from right to left to right, with adequate viewing time on each side. This type of implementation also permits the operator to continually follow an area of activity by means of this orientation control. This is shown in FIG. 15 by the dotted outline position which permits viewing a target 216 for a much longer period of time. In other words, the operator can start with the display center aligned to the ground track ahead of the helicopter and rotate it as desired, through 180° as the aircraft passes the area of activity.

Figure 16:
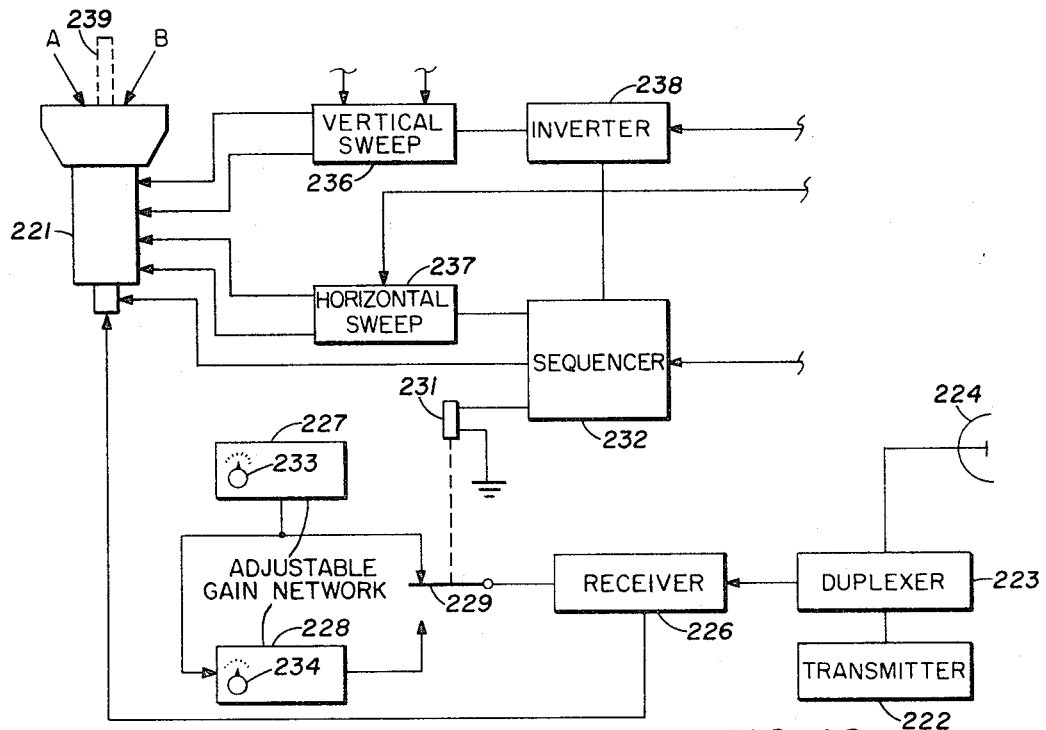
FIG. 16 is a partial schematic of a hard target indicating system.

In addition to moving target indication, the described system has potential usefulness for identifying upon a high resolution background, hard targets the radar cross section of which exceeds, by a significant amount, the general level of radar back scatter normally received from natural terrain and vegetation. The systems described are ideally suited for this function, since its high resolution capabilities already enhance the difference between the signal returned from discrete manmade targets to the clutter signal existing within the resolution cell. The optical comparator described for the area MTI readily lends itself to the generation of this superimposed hard-target display. Referring to FIG. 16, there is shown a portion of either the system in FIG. 1 or the system in FIG. 13 modified to include radar receiver gain controls which can independently control the brightness of radar maps displayed on opposite 180° sectors of a direct view storage tube 221. Radar signals representing the maps to be displayed on the storage tube 221 are generated in a system which includes a transmitter 222 coupled through a duplexer 223 to a linear antenna array by means of an antenna 224. Pulses received by the antenna array are transmitted through the duplexer 223 to a receiver 226 wherein they are characterized into IF signals connected to the electron gun of the storage tube 221. The receiver 226 is also coupled to a signal sensitivity gain control circuit including an adjustable gain network 227 interconnected to an adjustable gain network 228 and a two-position switch 229. Switch 229 is operably and mechanically coupled to a relay 231 connected to a display time spacing sequencer 232. Gain network 227 contains an adjustment 233 for establishing the magnitude of the receiver signals (receiver gain) of a high resolution map background displayed in sector B of the display tube 221. Gain network 228 includes an adjustment 234 for setting the magnitude of the received signals (receiver gain) of a hard target map displayed on sector A of the DVST. The receiver sensitivity for the hard target map as adjusted by the knob 234 is always relative to the receiver sensitivity for the map background as set by the knob 233. Thus, the gain circuit including the networks 227 and 228 establishes the intensity of the high resolution map background display on sector B and the hard target map displayed on sector A. The correct receiver sensitivity control signal is fed to the receiver 226 for the particular sector being painted through the switch 229 sequentially operated by the sequencer 232.

Control of the vertical deflection of the two display sweeps is accomplished by means of a vertical sweep driver 236 having connections to the vertical deflection yokes of the tube 221. Horizontal sweep control is provided by means of a horizontal sweep driver 237 also connected to the deflection yokes of both 180° sectors. As described previously with respect to the systems of FIGS. 1 and 13, the vertical sweep voltage is applied to the driver 236 through an inverter switch 238. The inverter switch 238 and the horizontal sweep driver 237 are sequenced by pulses from the time sequencer 232. The vertical and horizontal sweep circuits are similar to those described previously and only that portion is shown which is believed necessary for an understanding of hard target sensing. The sequencer 232 is part of a synchro chain including an azimuth sector controller in series with an azimuth synchro to produce timing signals synchronized with rotation of a radar antenna.

In the hard target sensing mode, images A and B are painted for every revolution of the antenna, that is, for one revolution image A will be painted and on the next revolution image B will be painted. This is a modification to the area MTI operation wherein the images are painted once every revolution or once every several revolutions of the antenna as selected by the operator. The switch 229 is also operated for each revolution of the antenna to connect the correct receiver sensitivity signal to the receiver 226.

Figure 17:
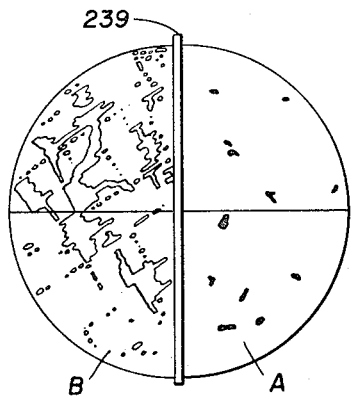
FIG. 17 is an illustration of opposite 180° image sectors as they would appear in a hard target indicating system.
Figure 18:
FIG. 18 is an illustration of the hard target display as viewed by an operator through a dichroic beam splitter.

In operation, the operator sets the gain network 227 for image B to produce the best appearing high resolution map background and the gain network 228 to emphasize certain hard targets on image A. As mentioned, the receiver sensitivity of the hard target map in sector A is always relative to the setting of the ground map as displayed in sector B. The operator adjusts the intensity settings of the two images for best presentation of the hard targets on a high resolution map background. The presentation as viewed by an operator through a beam splitting mirror 239 will show the stronger radar targets, still appearing on image A, superimposed on the high resolution ground map of image B. Such a presentation is illustrated in FIG. 17. The two radar maps shown are superimposed on one another by the mirror 239 in a manner similar to that described previously with respect to FIG. 1 as shown in FIG. 18. In FIG. 18, the heavy outline areas are the hard targets of image A superimposed on the ground map image B. Since the gain control of the hard target map (sector A) in FIG. 17 is calibrated relative to the map background gain control (sector B), the operator obtains an approximate relative measure of back scatter signal (or radar cross section) of the hard targets of interest. When the helicopter is operating in rural areas, those hard targets with radar cross sections of some 20 to 40 db above the map background are assumed by the operator to be cultural or man made targets and points of interest. The high resolution map background of image B orients the operator in precisely locating hard targets of interest on a chart or map.

The hard target mode will be azimuth stabilized for elimination of smearing, due to yaw perturbations of the aircraft, by either the systems described with respect to FIG. 1 or FIG. 13. When long range displays are being viewed, ground velocity stabiliztion will not be necessary; however, it may be desirable for short range surveillance to prevent smearing due to forward motion of the aircraft. Ground stabilization of the system in FIG. 16 is accomplished in the same manner as used for area MTI over a discrete sector of the display, except the operator will not see the velocity error as a color fringe unless gains 233 and 234 are equal.

Figure 19:
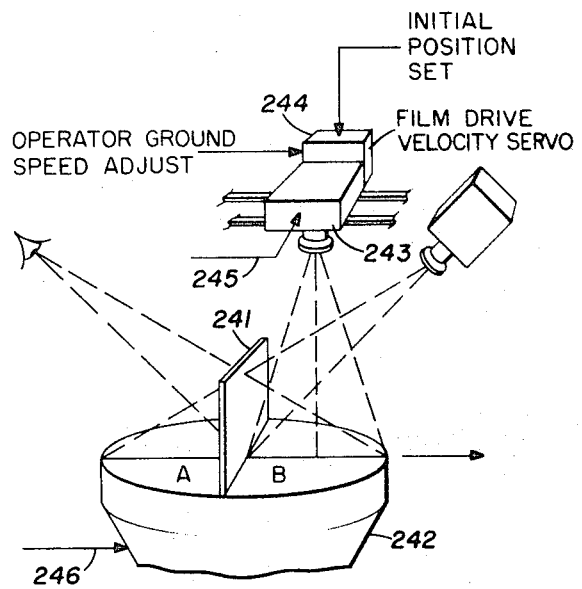
FIG. 19 shows a system for projecting aerial photographs on a direct view storage tube for a precision navigational system.

Another airborne application of the optical comparator described is in the area of terminal navigation over a preselected course. In the terminal navigation mode, a high resolution radar map is painted on one 180° sector and an aerial photograph projected on the opposite 180° sector. FIG. 19 shows the modifications of the systems previously described for the navigation mode. A dichroic mirror 241 is positioned orthogonal to the surface of a direct view storage tube 242 along a diameter separating a 180° sector for image A and an opposite 180° sector for image B. A film projector 243 is positioned to project a continuous areial photographic corridor relative to a preselected ground track as image B on the DVST242.

Initial alignment between the radar map and the photograph is accomplished by correlating preselected, prominent identification points which are easily discerned on both the radar and photograph. The initial relative positioning required to achieve proper registration is done by a cross-track (horizontal centering) control on the radar display and along track by a position adjustment of the film strip drive in the projector. Azimuth orientation is accomplished through the aximuth orientation control, 37 in FIG. 1 or similar. Compensation for ground speed is accomplished as before in FIG. 1 by the operator adjusting a velocity type servo (signal connected on line 245) which in this case drives the film transport instead of the radar display centering. A potentiometer, similar to potentiometer 73 in FIG. 1 or 194 in FIG. 13, will supply the ground speed signal. The cross track adjustment is accomplished by a signal on line 246 controlling the horizontal centering of the display. The position of this horizontal control is a measure of the cross track error and hence is a steering command for the pilot.

To implement the terminal navigation mode, aerial photographs centered on the desired ground path are prepared into a continuous film strip from a photographic mosaic of the area. Film strips are prepared of a selected flight path, such as the strips 248, 249, and 251 of FIG. 20, which includes a first leg from the take-off point 252 to a first identification point 253, a second leg from the identification point 253 to a second identification point 254 to a landing site 256. For the first two legs, the aerial film projected as image B on the tube 242 covers a 6-mile wide corridor while the third leg covers a 2 nautical mile corridor. During the first leg the ground track of the aircraft is originally indexed on the identification point 256A. A high resolution radar map is displayed as image A of the first leg corridor having a range scale to coincide with that of the aerial photograph. As in the hard target sensing mode, a radar map will be generated in sector A for every revolution of the radar antenna. By means of the control knob 189, of FIG. 13, the operator adjusts the rate of movement of the film drive for the projector 243 to coincide with the high resolution radar map painted as image A.

Referring to FIG. 21, the operator selects a particular target, such as target 257, which appears on both the photograh and the radar map, and trims his controls such that this target appears superimposed when viewed through the mirror 251. In the situation shown, the position of the aircraft is indicated at point 258 at the center of the high resolution radar map. The ground track of the aircraft is parallel to the selected ground track projected by the camera 243 as image B. Note there is both a cross-track error and an along-track error. This condition exists when the high resolution radar map displayed as image A is of an area ahead of that projected as image B; the film speed, however, is in synchronism with the radar map as indicated by a constant displacement of the target 257 on the radar map and the aerial photograph. To eliminate the along-track error, a fore or aft adjustment of the projected and photographic image is made by means of the adjustment 244. A display with only cross-track error is illustrated in FIG. 22, wherein the cross-track error is indicated by a side-by-side displacement of the target 257. This cross error is displayed to the pilot to steer right until the radar target and its associated corridor plot of the projected photo coincide. The radar display is stabilized in azimuth by a directional gyro as described with reference to FIGS. 1 and 13. When the identification point 253 is approached, where a course change is planned, the operator must again index the system for the flight path 249 readjusting his display until the high resolution radar map and the projected film are in coincidence. When the identification point 254 is reached, a film strip is selected indicating a 2 mile wide corridor and the range of the high resolution radar map is reduced to coincide with the 2 mile wide film strip. The operator now flies along the flight path 251 until the target 256, that is, the selected landing area, appears on the film strip and the high resolution radar map. Thus, with the system described, an aircraft can navigate over unfamiliar terrain without the aid of conventional navigational aids such as geographical highlights or celestial aids, and arrive at his destination with great precision, and positive identification of the landing zone.

In addition to moving and hard target display, the systems described can also be applied to airport surveillance and taxi conditions. Moving targets on the ground, such as taxiing aircraft or vehicular traffic, will be displayed in color for greatly improved discernability. The described systems may also be readily adapted for a low cost air surveillance radar for use at small air fields. Instead of employing an expensive moving target processor, such as a single or dual canceler unit, the display techniques of this invention may present moving aircraft in color where resolved from the "white" ground clutter targets by the resolution of the radar system. display.

To further emphasize that the described moving and hard target display techniques are not limited to airborne applications, it is also contemplated that the systems described may be used for battlefield surveillance principally as an activity indicator. A simple lightweight radar supplies the necessary video signals to the display system. Simplification is possible since directional and ground velocity stabilization would not be required with a ground based system, such as contemplated for battlefield or airport surveillance.

While several embodiments of the invention, together with modifications thereof, have been described in detail herein and shown in the accompanying drawings, it will be evident that various further modifications are possible in the arrangement and construction of its components without departing from the scope of the invention.

What is claimed is:

1. A system for displaying high frequency signals representative of a given area under surveillance comprising:
    means for visually displaying said signals as two patterns generated independently of each other which are spaced in time, the second pattern being a mirror image of the first,
    means for selecting the area to be scanned and for controlling the time spacing of said first and second display paterns, and
    optical means for viewing both display patterns simultaneously and color coding the differences therein.

2. A display system as set forth in claim 1 wherein said display means is a direct view storage tube displaying the first pattern on one 180° sector and the mirror image pattern on the opposite 180° sector.

3. A display system as set forth in claim 2 wherein said optical means is a dichroic beam splitter positioned orthogonal to the face of said storage tube between said display sectors.

4. A display system as set forth in claim 3 wherein said dichroic beam splitter transmits blue and green and reflects red and yellow to color code the difference in the display patterns in red and green.

5. A system for displaying high frequency signals received from a rotating antenna and representative of a given area under surveillance comprising:
    means for visually displaying said signals as two patterns generated independently of each other in sequence, said display means having horizontal and vertical controls,
    horizontal control means for controlling the horizontal sweep of said first and second display patterns,
    vertical control means for generating a signal to control the vertical sweep of said first and second display patterns such that the second pattern is a mirror image of the first,
    means for selecting an area to be scanned and for actuating said horizontal and vertical control means to sequence the starting time and position of said first and second display patterns, and
    optical means for viewing both displays simultaneously and color coding the differences therein.

6. A display system as set forth in claim 5 wherein said area selecting and pattern sequencing means includes means for synchronizing the time sequence of said displays with the rotation of said antenna.

7. A display system as set forth in claim 5 including means for controlling the sequencing interval between said display patterns.

8. A display system as set forth in claim 6 wherein said display means includes a direct view storage tube for displaying one pattern on one 180° sector and the second mirror image pattern on the opposite 180° sector.

9. A display system as set forth in claim 8 including means for erasing the pattern on each sector of said display tube prior to generating another pattern in the sector erased.

10. An airborne area moving target indicator comprising:
    means for visually displaying high frequency signals as two patterns generated independently in time sequence, said display means including horizontal and vertical controls,
    means for generating said signals from pulses received by a rotating antenna to represent a given area under surveillance, said signals coupled to said display means,
    horizontal control means for generating horizontal sweep signals for said first and second display patterns,
    vertical sweep control means for generating vertical sweep signals for said first and second display patterns such that the second pattern is the mirror image of the first,
    means for selecting an area to be scanned and for controlling the time sequence of said first and second display patterns,
    ground speed control means for generating a centering signal to said vertical sweep control means to center said first and second display patterns thereby stabilizing the display relative to the area under surveillance, and
    optical means for viewing both displays simultaneously and color coding the differences therein.

11. An airborne area moving target indicator as set forth in claim 10 wherein said area selector and display control means includes a directional compass for maintaining the center line of said displays on a preselected ground track.

12. An airborne area moving target indicator as set forth in claim 11 wherein said area selecting and display control means further includes means for synchronizing the sequencing of said displays with the rotation of said antenna.

13. An airborne area moving target indicator as set forth in claim 12 including means for selecting the range of the high frequency signals.

14. An airborne area moving target indicator as set forth in claim 13 wherein said visual display means includes a direct view storage tube and said first display pattern is generated on one 180° sector and said second display pattern generated on the opposite 180° sector.

15. An airborne area moving target indicator as set forth in claim 14 wherein said optical means includes a dichroic beam splitter positioned orthogonal to the face of said storage tube between the opposed 180° display sectors.

16. An airborne area moving target indicator as set forth in claim 15 wherein said storage tube includes means for erasing said displays independent of each other.

17. An airborne area moving target indicator as set forth in claim 16 including means for erasing said display patterns independently of each other prior to generating another pattern in the respective sections.

18. An airborne system for displaying high frequency signals generated by a radar system receiving reflected pulses from a rotating antenna comprising:
    a direct view storage tube having horizontal and vertical deflection yokes for displaying said signals as two patterns generated independently in time sequence on 180° sectors of said tube, one of said patterns being the mirror image of the other, a vertical sweep driver coupled to the vertical deflection yokes of said display tube for generating the vertical component of said patterns, a horizontal sweep driver connected to the horizontal deflection yokes of said storage tube for generating the horizontal component of said pattern, means for generating phase displaced sweep voltages to said vertical and horizontal sweep drivers, respectively, means for inverting the sweep voltage coupled to said vertical sweep driver, means for directionally stabilizing said patterns along a given azimuth coupled to said sweep voltage generating means, means for orienting the center line of said patterns along a preselected axis coupled to said sweep voltage generating means, means for generating a centering voltage coupled to said vertical sweep driver for varying the center point of said displays along the preselected axis, means for varying said centering voltage in accordance with the ground speed of an aircraft, and a dichroic beam splitter mirror positioned orthogonal to the viewing face of said storage tube and between the opposed patterns.

19. A display system as st forth in claim 18 including a time display sequencer generating time sequencing trigger pulses to said storage tube, to said signal inverting means, and to said centering voltage generating means to reverse the polarity of the centering voltage coupled to said vertical driver.

20. A display system as set forth in claim 19 wherein said directional stabilization means includes a directional compass and an azimuth synchro coupled to and synchronized with the rotation of said antenna.

21. A display system as set forth in claim 20 including means for synchronizing the operation of said sequencer with the position of said rotating antenna and said directional compass.

22. A display system as set forth in claim 18 including a second centering voltage generating means coupled to said horizontal sweep driver and responsive to said ground speed means for controlling the center of said display patterns in two directions along a preselected axis.

23. A display system as set forth in claim 22 including means for erasing the pattern on said sector of said display tube prior to generating another pattern thereon.

24. A display system for color coding the difference between the photograph of a given area and a radar map of the same area comprising:

a direct view storage tube for displaying the radar map on one 180° sector therof and displaying said aerial photograph on the opposite 180° sector, and a dichroic beam splitter mirror positioned orthogonal to the face of said storage tube between the opposed 180° display sectors.

25. A display system as set forth in claim 24 including means for orienting said radar map to display the same area recorded in said photograph.

26. A display system as set forth in claim 25 including directional stabilization means for maintaining the center point of said radar map along a given azimuth direction.

27. A display system as set forth in claim 26 including means for adjusting the center line of said radar map along a preselected axis.

28. A hard target indicator comprising:
means for visually displaying high frequency signals as two radar patterns generated independently in time sequence, said display means including horizontal and vertical controls, means for generating said signals from pulses received by a rotating antenna to represent a given area under surveillance said signals coupled to said display means, horizontal control means for generating horizontal sweep signals for said first and second display patterns, vertical sweep control means for generating vertical sweep signals for said first and second display patterns such that the second pattern is a mirror image of the first, means for selecting an area to be scanned and controlling the time sequence of said first and second display patterns, means for controlling the size of targets of said display patterns coupled to said display means and synchronized with the time sequence of said first and second display patterns, and optical means for viewing both displays simultaneously and color coding the differences therein.

29. A hard target indicator as set forth in claim 28 wherein said intensity control means generates a high resolution radar map in color as one display pattern and a white hard target radar map as the opposite display pattern.

30. A hard target indicator as set forth in claim 29 wherein said intensity control means includes a first gain network to adjust the intensity of said high resolution radar map and a second gain network for adjusting the intensity of said hard target radar map relative to said high resolution radar map.

31. A system wherein the difference between an aerial mosaic of a flight path and a radar map are employed for aircraft terminal navigation comprising:

a direct view storage tube for displaying the aerial mosaic of a desired flight path on one 180° sector thereof and displaying the radar map of the actual flight path on the opposite 180° sector, means for adjusting the speed of the aerial mosaic display to coincide with the ground speed of said aircraft, and a dichroic beam splitter mirror positioned orthogonal to the face of said storage tube between opposed 180° display sectors.

32. A terminal navigation system as set forth in claim 31 including means for indicating the ground speed of said aircraft from said aerial mosaic speed adjusting means.

33. A terminal navigation system as set forth in claim 32 including means for determining the ground track of said aircraft from said direct view storage tube.

34. A system for displaying high frequency signals representative of a given area under surveillance comprising:

means for visually displaying said signals as two patterns generated independently of each other which are spaced in time, the second pattern being a mirror image of the first, means for selecting the area to be scanned and for controlling the time spacing of said first and second display patterns, and dichroic beam splitter means for viewing both display patterns simultaneously and color coding the differences therein.

* * * * *